United States Patent
Jing et al.

(10) Patent No.: US 9,866,115 B2
(45) Date of Patent: Jan. 9, 2018

(54) REDUCTION OF FREQUENCY VARIATION FOR RIPPLE BASED, CONSTANT-ON-TIME DC-DC CONVERTERS

(71) Applicant: NXP B.V., Eindhoven (NL)

(72) Inventors: Yue Jing, Tempe, AZ (US); Ahmad Dashtestani, Scottsdale, AZ (US); Shufan Chan, Milpitas, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/088,597

(22) Filed: Apr. 1, 2016

(65) Prior Publication Data
US 2017/0288537 A1    Oct. 5, 2017

(51) Int. Cl.
*H02M 3/156* (2006.01)
*H02M 1/08* (2006.01)

(52) U.S. Cl.
CPC ............ *H02M 3/156* (2013.01); *H02M 1/08* (2013.01)

(58) Field of Classification Search
CPC .... H02M 3/155–3/158; H02M 3/1563; H02M 3/1584; H02M 3/1588; H02M 3/10; Y02B 70/1466
USPC .............. 323/271, 272, 282–285, 288–290
See application file for complete search history.

(56) References Cited

U.S. PATENT DOCUMENTS

| | | | |
|---|---|---|---|
| 5,602,465 A * | 2/1997 | Clemente | H02M 1/4225 323/222 |
| 5,770,940 A | 6/1998 | Goder | |
| 6,885,175 B2 | 4/2005 | Mihalka | |
| 7,053,595 B1 | 5/2006 | Mei et al. | |
| 7,671,573 B1 * | 3/2010 | Ling | H02M 3/156 323/283 |
| 8,334,682 B2 | 12/2012 | Chiu et al. | |
| 8,446,135 B2 | 5/2013 | Chen et al. | |
| 8,593,125 B1 * | 11/2013 | Xue | H02M 3/156 323/280 |
| 9,391,511 B2 | 7/2016 | Yu et al. | |
| 2002/0125869 A1 | 9/2002 | Groom et al. | |

(Continued)

FOREIGN PATENT DOCUMENTS

| | | |
|---|---|---|
| CN | 103576734 A | 2/2014 |
| JP | 2014018030 A | 1/2014 |

OTHER PUBLICATIONS

Lin, Yu-Cheng et al.; "A Ripple-Based Constant On-Time Control with Virtual Inductor Current and Offset Cancellation for DC Power Converters"; IEEE transactions on Power Electronics, vol. 27, No. 10; pp. 4301-4310; Oct. 2012.

(Continued)

*Primary Examiner* — Yemane Mehari

(57) ABSTRACT

Embodiments of a circuit for use with a DC-DC converter are disclosed. In an embodiment, a circuit for controlling frequency variation for a ripple based, constant-on time DC-DC converter, is discloses. The circuit includes a set/reset (SR) latch, a comparator configured to set the SR latch, and an on-time and frequency variation controller configured to reset the SR latch. The on-time and frequency variation controller includes a feedback loop configured to increase the rate at which a ramp voltage increases to reduce the time it takes for the ramp voltage to exceed a threshold voltage. Embodiments of a method for controlling frequency variation for a ripple based, constant-on time DC-DC converter are also disclosed.

20 Claims, 11 Drawing Sheets

(56) References Cited

U.S. PATENT DOCUMENTS

| | | |
|---|---|---|
| 2005/0017703 A1 | 1/2005 | Walters et al. |
| 2009/0237049 A1 | 9/2009 | Hachiya et al. |
| 2011/0291626 A1 | 12/2011 | Murakami |
| 2012/0139507 A1 | 6/2012 | Ferguson |
| 2012/0153910 A1 | 6/2012 | Bulzacchelli et al. |
| 2013/0249524 A1 | 9/2013 | Kujala et al. |
| 2014/0292288 A1 | 10/2014 | Yan et al. |
| 2015/0280557 A1 | 10/2015 | Xue et al. |

OTHER PUBLICATIONS

Non Final Office Action; U.S. Appl. No. 15/088,661; 26 pages (dated Jul. 3, 2017).
U.S. Appl. No. 15/088,661; 27 pages (filed Apr. 1, 2016).

\* cited by examiner

REDUCTION OF FREQUENCY VARIATION FOR RIPPLE BASED, CONSTANT-ON-TIME DC-DC CONVERTERS

BACKGROUND

Constant on-time boost converters are known for their fast transient responses, ease of design, smaller and simpler controllers, and elimination of sub-harmonic oscillations. However, there are some drawbacks such as variable switching frequency and also direct current (DC) offset error.

SUMMARY

Embodiments of a circuit for use with a DC-DC converter are disclosed. In an embodiment, a circuit for controlling frequency variation for a ripple based, constant-on time DC-DC converter, is discloses. The circuit includes a set/reset (SR) latch, a comparator configured to set the SR latch, and an on-time and frequency variation controller configured to reset the SR latch. The on-time and frequency variation controller includes a feedback loop configured to increase the rate at which a ramp voltage increases to reduce the time it takes for the ramp voltage to exceed a threshold voltage.

In an embodiment, the feedback loop includes a circuit configured to generate a slope gain value and to increase the rate at which the ramp voltage increases as a function of the slope gain value.

In an embodiment, the feedback loop includes a sample and hold circuit, a divider, and a multiplier.

In an embodiment, the sample and hold circuit is configured to output a sampled and held value to the divider, the divider is configured to divide the sampled and held value by the threshold voltage to produce the slope gain value, and the multiplier is configured to multiply by the slope gain value.

In an embodiment, an inductor current ripple based, constant-on time DC-DC boost converter includes the above-described circuit.

In an embodiment, an inductor current ripple based, constant-on time DC-DC buck converter includes the above-described circuit.

In an embodiment, an output voltage ripple based, constant-on time DC-DC buck converter includes the above-described circuit.

In an embodiment, a method for controlling frequency variation for a ripple based, constant-on time DC-DC converter is disclosed. The method involves setting a set/reset (SR) latch in response to an output voltage of the DC-DC converter, wherein setting the SR latch involves increasing the rate at which a ramp voltage increases to reduce the time it takes for the ramp voltage to exceed a threshold voltage. The method also involves resetting the SR latch in response to the ramp voltage exceeding the threshold voltage.

In an embodiment, increasing the rate at which the ramp voltage increases involves sampling and holding the ramp voltage to capture a peak ramp voltage.

In an embodiment, increasing the rate at which the ramp voltage increases involves dividing the peak ramp voltage by the threshold voltage to generate a slope gain value.

In an embodiment, increasing the rate at which the ramp voltage increases involves multiplying a voltage by the slope gain value.

In an embodiment, an inductor current ripple based, constant-on time DC-DC boost converter is configured to implement the above-described method.

In an embodiment, an inductor current ripple based, constant-on time DC-DC buck converter is configured to implement the above-described method.

In an embodiment, an output voltage ripple based, constant-on time DC-DC buck converter is configured to implement the above-described method.

Another embodiment of a circuit for controlling frequency variation for an inductor current ripple based, constant-on time DC-DC converter is disclosed. The circuit includes a set/reset (SR) latch, a comparator configured to set the SR latch, and an on-time and frequency variation controller configured to reset the SR latch. The on-time and frequency variation controller includes a comparator having a first input and a second input, a capacitor connected to the second input of the comparator and configured to provide a ramp voltage to the comparator, a reset switch connected to the second input of the comparator, an operational transconductance amplifier (OTA) connected to the second input of the comparator and having a first input and a second input, and a feedback loop connected between the second input of the comparator and the first input of the OTA and configured to increase the rate at which the ramp voltage increases.

In an embodiment, the feedback loop includes a circuit configured to generate a slope gain value and to increase the rate at which the ramp voltage increases as a function of the slope gain value.

In an embodiment, the feedback loop includes a sample and hold circuit, a divider, and a multiplier.

In an embodiment, the sample and hold circuit is configured to output a sampled value to the divider, the divider is configured to divide the sampled value by the threshold voltage to produce the slope gain value, and the multiplier is configured to multiply by the slope gain value.

In an embodiment, an inductor current ripple based, constant-on time DC-DC boost converter includes the above-described circuit.

In an embodiment, an inductor current ripple based, constant-on time DC-DC buck converter includes the above-described circuit.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1A:
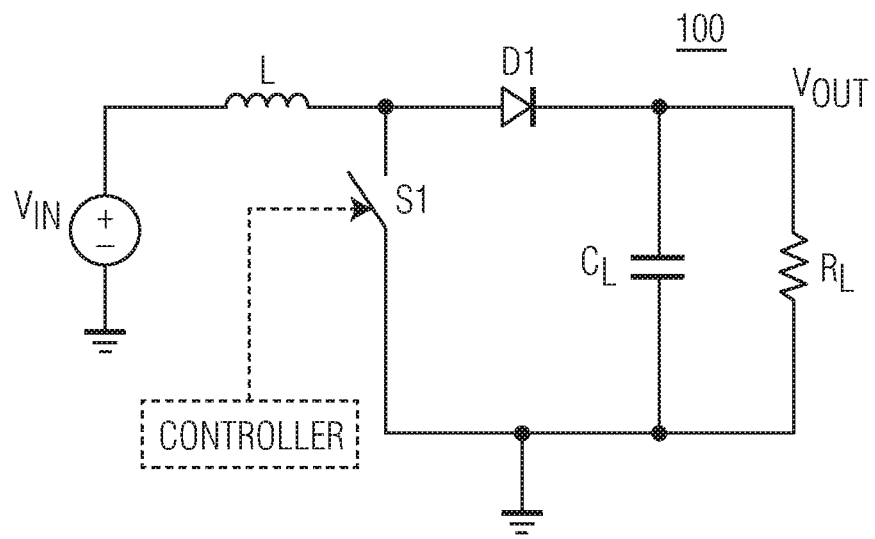
FIG. 1A shows the basic structure of a DC-DC step-up converter, also referred to as a boost converter.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Constant on-time boost converters are known for their fast transient responses, ease of design, smaller and simpler controllers, and elimination of sub-harmonic oscillations. There are some drawbacks such as variable switching frequency (which may not be attractive for some applications) and also direct current (DC) offset error. In an embodiment in accordance with the invention, in order to reduce frequency variations, the rate of increase of the ramp voltage is increased in order to reduce the time it takes for the ramp voltage to exceed the threshold voltage. For example, variable switching frequency is addressed in DC-DC converters by adjusting and tuning the current that charges the constant on-time capacitor to eliminate loop delays (e.g., due to comparator and other gates), which are the root cause for switching frequency variations.

Figure 1B:
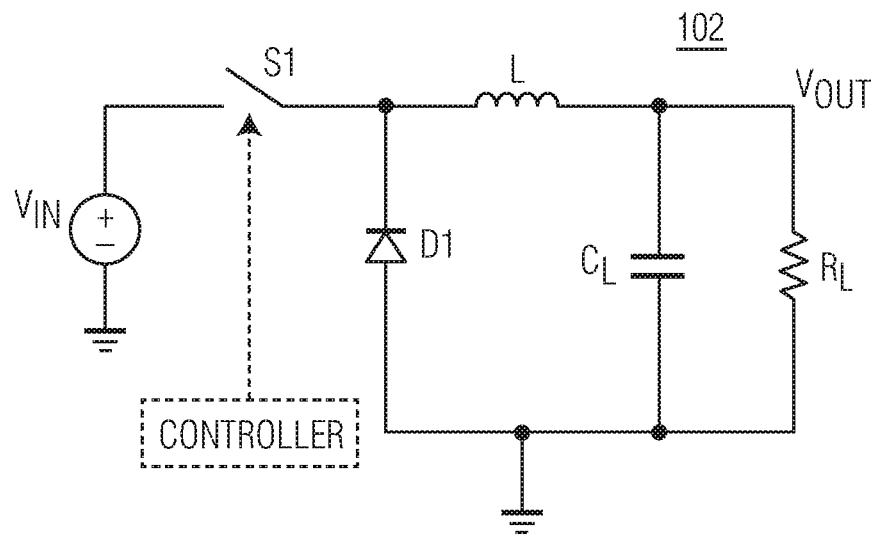
FIG. 1B shows the basic structure of a DC-DC step-down converter, also referred to as a buck converter.

FIG. 1A depicts a basic structure of a DC-DC step-up converter 100, also referred to as a boost converter, and FIG. 1B depicts a basic structure of a DC-DC step-down converter 102, also known as a buck converter. With reference to FIG. 1A, the DC-DC boost converter includes a voltage source, $V_{IN}$, a switch, S1, a controller, a diode, D1, an inductor, L, a capacitor, $C_L$, and a load, identified as a resistor, $R_L$. With reference to FIG. 1B, the DC-DC buck converter includes a voltage source, $V_{IN}$, a switch, S1, a controller, a diode, D1, an inductor, L, a capacitor, $C_L$, and a load, identified as a resistor, $R_L$. In various embodiments of the boost and buck converters, the voltage source may be a battery and the switch may be a PMOS or NMOS switch as is known in the field.

For the boost converter 100 of FIG. 1A, the output voltage could be as low as the input voltage or as high as the components can handle, mathematically there is no limit. For the buck converter 102 of FIG. 1B, in theory the output voltage could be anywhere from ground all the way to the input voltage, however, there are practical limitations to these two extremes. In order to have a regulated output voltage that stays at a desired value regardless of disturbances such as load current or input variations (known as load regulations and line regulations), the controller controls the switch, S1. In some applications, the diode, D1, is replaced with another switch and such controllers are known as synchronous controllers, as opposed to asynchronous controller that utilize a diode.

Regardless of the choice for the diode, D1, there are many choices for the controller. Some controllers provide a fixed switching frequency (known as pulse-width-modulation (PWM)) and utilize either the inductor current or the output/capacitor voltage to regulate the output voltage and fall into the categories of current-mode PWM or voltage-mode PWM controllers. There is a different category of controllers that offers faster dynamic responses compared to current-mode PWM and voltage-mode PWM controllers, which is known as ripple based controllers, or hysteretic controllers, which is a superset of ripple based controllers.

Figure 2A:
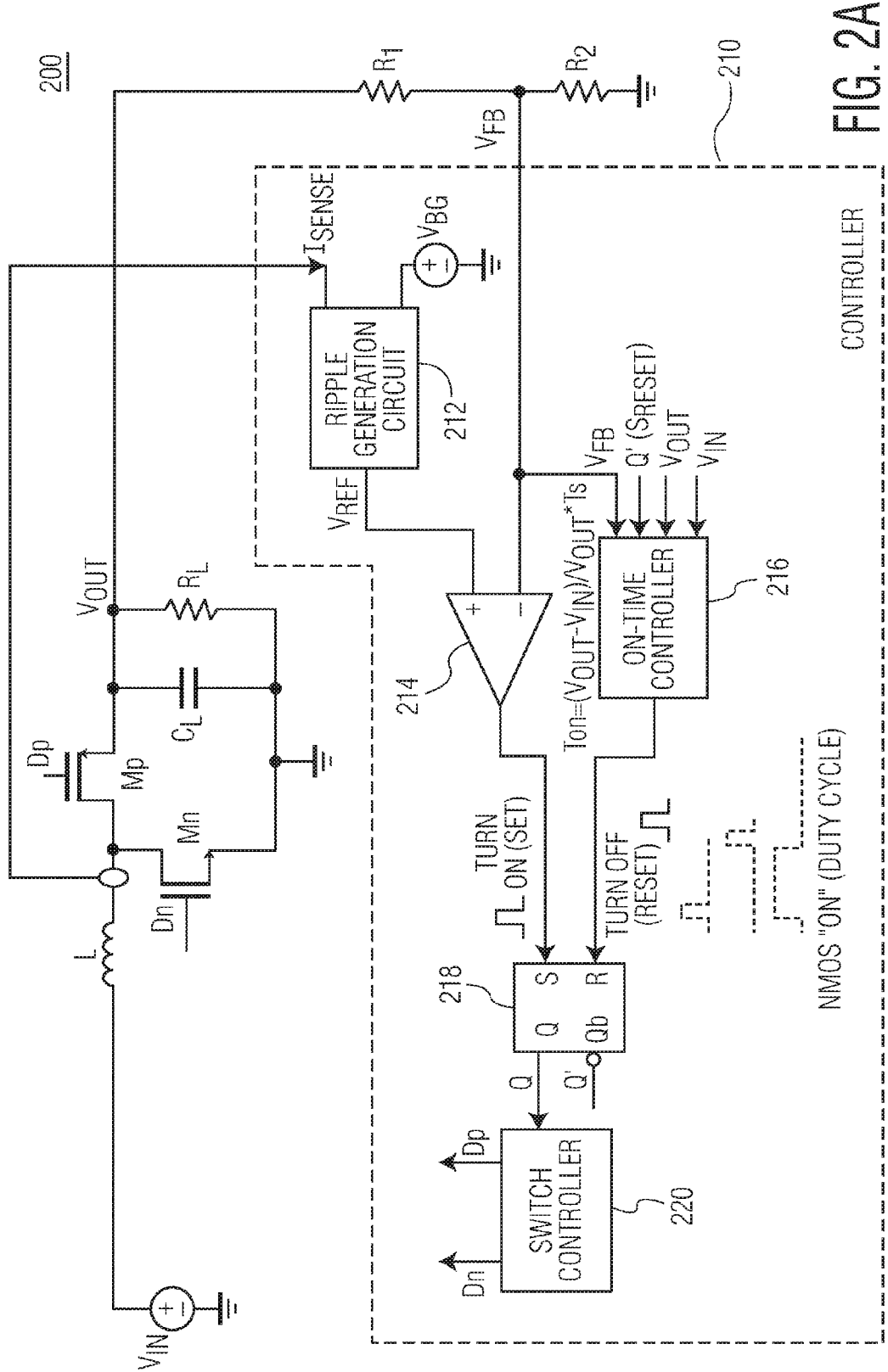
FIG. 2A is one implementation of a constant on-time inductor current ripple based boost converter.
Figure 2B:
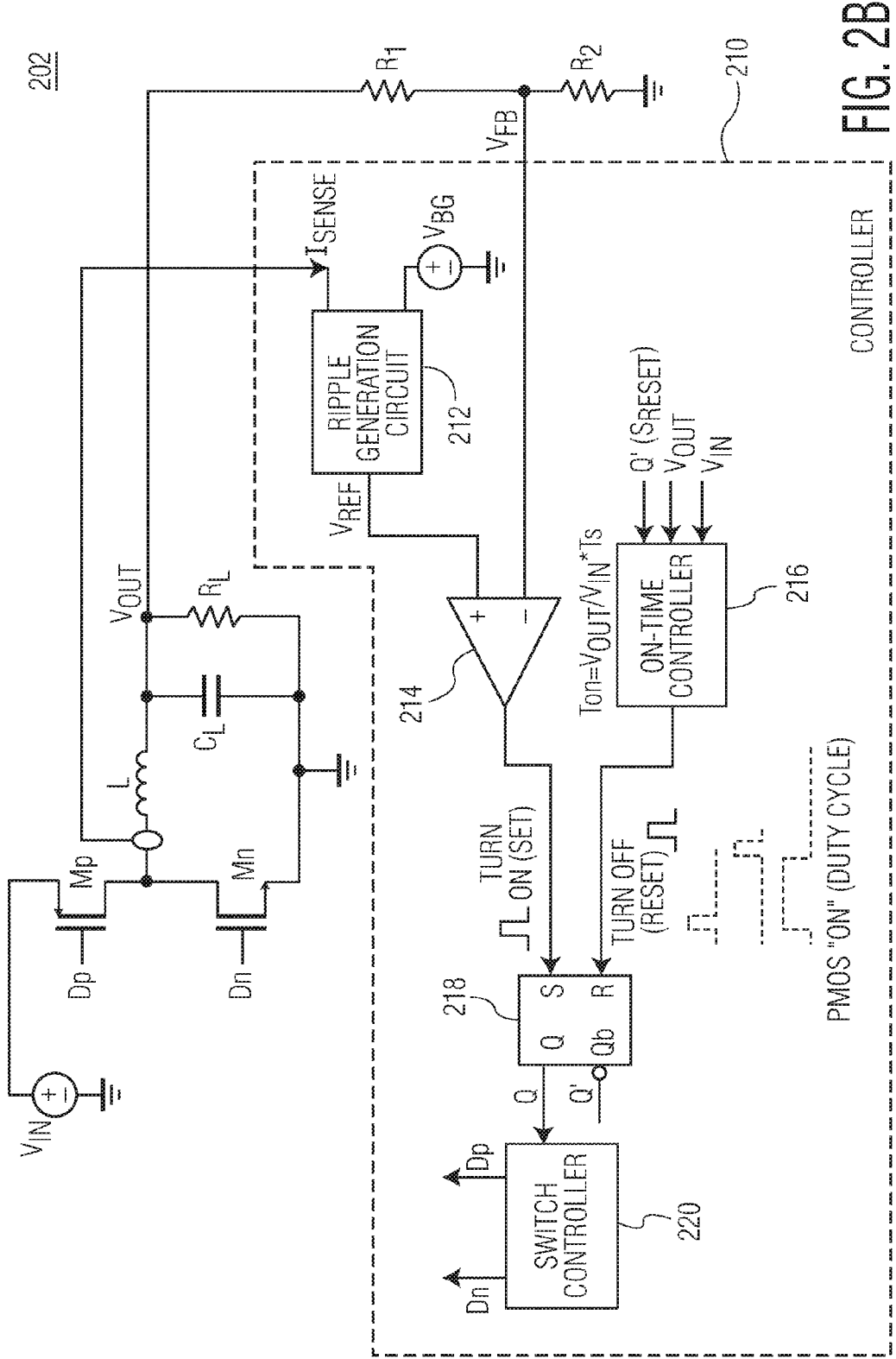
FIG. 2B is one implementation of a constant on-time inductor current ripple based buck converter.

Hysteretic controllers offer many advantages over current-mode PWM and voltage-mode PWM controllers but at the same time are not free of drawbacks. Although hysteretic controllers provide much faster recovery from disturbances to input voltage(s) and load current(s) and have relatively simple designs, hysteretic controllers suffer from DC offset error and variations in the switching frequency. FIG. 2A is one implementation of a known constant on-time inductor current based ripple control boost converter 200 and FIG. 2B is one implementation of a known constant on-time inductor current ripple based buck converter 202. With reference to FIG. 2A, the DC-DC boost converter includes a voltage source, $V_{IN}$, an inductor, L, an NMOS switch, Mn, a PMOS switch, Mp, a capacitor, $C_L$, a load (represented as a resistor), $R_L$, a feedback resistor, $R_1$, a feedback resistor, $R_2$, and a controller 210. The controller includes a ripple generation circuit 212, a comparator 214, an on-time controller 216, a set/reset (SR) latch 218, and a switch controller 220. The DC-DC buck converter of FIG. 2B includes similar elements to those in FIG. 2A. Each of the elements of FIGS. 2A and 2B is known in the field. Operation of both the DC-DC boost and buck converters is described below.

In the case of the boost converter 200 (FIG. 2A), when a turn-on pulse (e.g., a "set" signal) is sent from the comparator 214, it sets the SR latch 218, causing the output of the SR latch, "Q," to go to HIGH. A HIGH Q signal causes the NMOS switch, Mn, to be turned on (i.e., the NMOS switch is closed) and causes the PMOS switch, Mp, to be turned off (i.e., the PMOS switch is open) in response to the respective control signals, Dn and Dp, from the switch controller 220. In the case of the buck converter 202 (FIG. 2B), a HIGH Q signal causes the PMOS switch, Mp, to be turned on (i.e., the PMOS switch is closed) and causes the NMOS switch, Mn, to be turned off (i.e., the NMOS switch is open). In both cases, at this sub-period, the inductor current increases. After a pre-defined "on-time" (e.g., set by design, per specs), the on-time controller 216 sends a turn-off pulse (e.g., a "reset" signal), which resets the SR latch, causing the output of the SR latch, "Q," to change to LOW. In the case of the boost converter, the NMOS switch, Mn, turns off and the PMOS switch, Mp, turns on and for the buck converter, the PMOS switch, Mp, turns off and the NMOS switch, Mn, turns on. In both cases, at this sub-period, the inductor current decreases due to delivering energy to the load (e.g., $R_L$). At some point in time, the reference voltage, $V_{REF}$, exceeds the feedback voltage, $V_{FB}$, (again), and then the comparator sends a new turn-on pulse. The controller keeps providing the turn-on and turn-off signals and the DC-DC converter regulates and provides a desired output voltage.

It is important to note that the sub-period during which the inductor, L, is being energized is fixed for both the boost converter 200 and the buck converter 202, and at steady-state the off time stays relatively constant, so the converter switching frequency does not change. In continuous conduction mode (CCM) for a boost converter, in which the inductor current stays greater than zero all the time, the duty cycle (e.g., the time that the inductor is being energized) is expressed in equation (1) as:

$$D=(V_{OUT}-V_{IN})/V_{OUT} \qquad (1)$$

At steady-state, the relationship between the switching period, $T_S$, and the on-time, $T_{ON}$, is expressed in equation (2) as:

$$T_{ON}=((V_{OUT}-V_{IN})/V_{OUT}) \cdot T_S \qquad (2)$$

In continuous conduction mode (CCM) for a buck converter, in which the inductor current stays greater than zero all the time, the duty cycle (e.g., the time that the inductor is being energized) is expressed in equation (3) as:

$$D=V_{OUT}/V_{IN} \qquad (3)$$

At steady-state, the relationship between the switching period, $T_S$, and the on-time, $T_{ON}$, is expressed in equation (4) as:

$$T_{ON}=(V_{OUT}/V_{IN}) \cdot T_S \qquad (4)$$

Equations (2) and (4) hold for both PWM controllers in steady-state and constant on-time controllers in steady-state, and since the on-time, $T_{ON}$, is proportional to $(V_{OUT}-V_{IN})/V_{OUT}$ and $V_{OUT}/V_{IN}$, respectively, the switching period, $T_S$, becomes a constant value in steady-state. This is how a constant on-time controller generates a switching frequency (constant switching frequency) without the need for a clock. However, in practice, the switching period, $T_S$, exhibits some variations that translate to variations in the switching frequency.

Figure 3A:
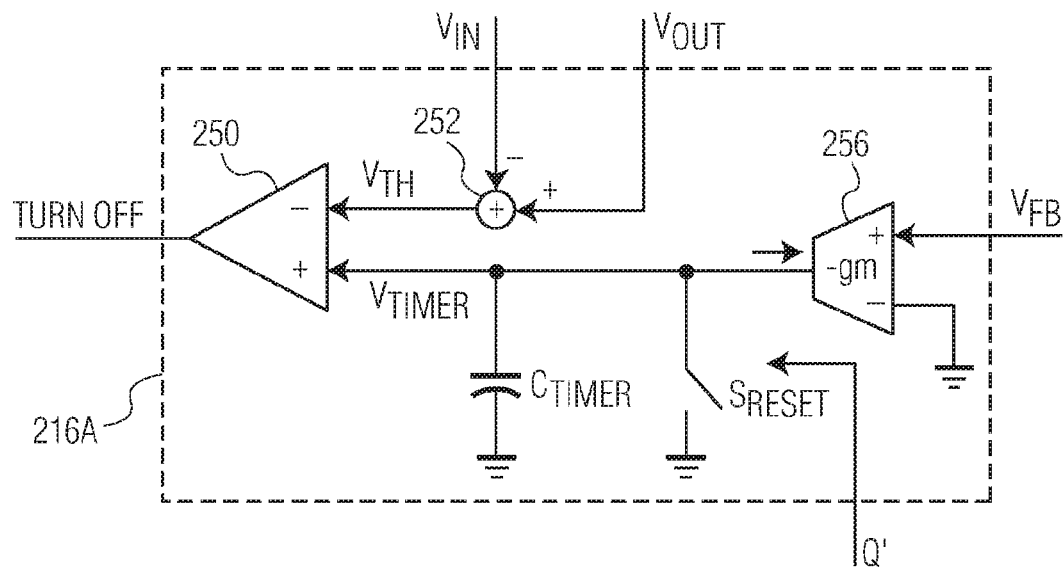
FIG. 3A depicts an embodiment of an on-time controller for the boost converter of FIG. 2A.

FIG. 3A is a block diagram of an embodiment of the on-time controller 216A from the boost converter 200 of FIG. 2A. The on-time controller includes a comparator 250, a subtractor 252, a capacitor, $C_{TIMER}$, a reset switch, $S_{RESET}$, and an operational transconductance amplifier (OTA) 256 (also referred to as a "GM cell"). In operation, a current that is proportional to the output voltage, $V_{OUT}$, (e.g., feedback voltage, $V_{FB}$) is generated by the OTA and charges the capacitor, $C_{TIMER}$, thereby generating a corresponding ramp voltage, $V_{TIMER}$. A threshold voltage, $V_{TH}$, (which is the difference between the output voltage, $V_{OUT}$, and input voltage, $V_{IN}$ from the subtractor) is connected to the negative input of the comparator 250. When the ramp voltage, $V_{TIMER}$, reaches the threshold voltage, $V_{TH}$, the comparator 250 trips and a "Turn Off" signal is generated to reset the SR latch 218 (FIG. 2A). Upon reset of the SR latch, the SR latch output, Q', goes HIGH, causing the reset switch, $S_{RESET}$, to close, thereby discharging the on-time controller capacitor, $C_{TIMER}$.

Figure 3B:
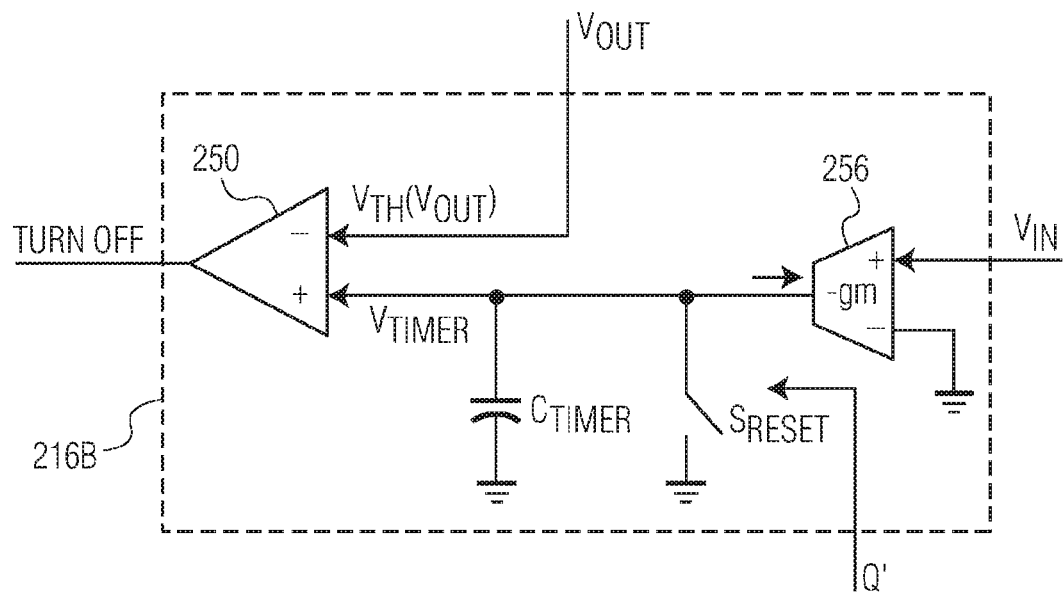
FIG. 3B depicts an embodiment of an on-time controller for the buck converter of FIG. 2B.

FIG. 3B is a block diagram of an embodiment of the on-time controller 216B from the buck converter 202 of FIG. 2B. The on-time controller includes a comparator 250, a capacitor, $C_{TIMER}$, a reset switch, $S_{RESET}$, and an OTA 256. In operation, a current that is proportional to the input voltage, $V_{IN}$, is generated by the OTA and charges the capacitor, $C_{TIMER}$, generating a ramp voltage, $V_{TIMER}$. A threshold voltage, $V_{TH}$, (which is proportional to the output voltage, $V_{OUT}$) is connected to the negative input of the comparator 256. When the ramp voltage, $V_{TIMER}$, reaches the threshold voltage, $V_{TH}$, the comparator 256 trips and a "Turn Off" signal is generated to reset the SR latch 218 (FIG. 2B). Upon reset of the SR latch, the SR latch output, Q', goes HIGH, causing the reset switch, $S_{RESET}$, to close, thereby discharging the on-time controller capacitor, $C_{TIMER}$.

Figure 4:
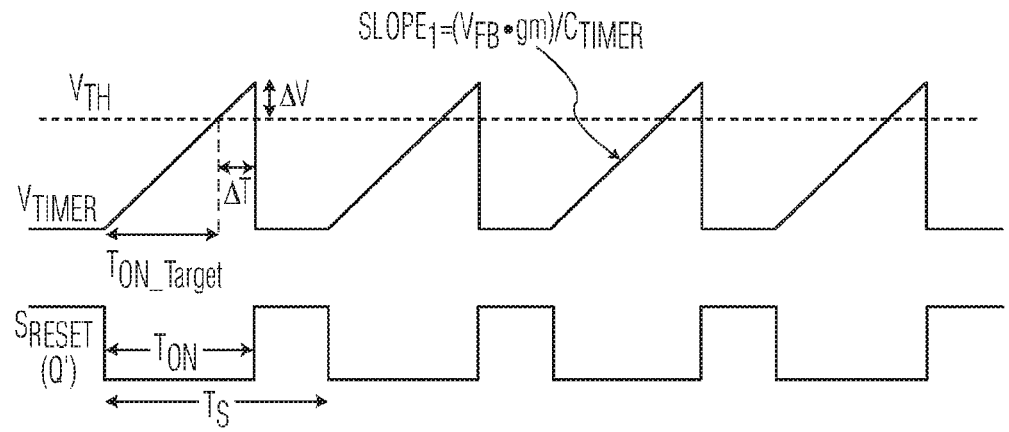
FIG. 4 depicts waveforms of a ramp voltage, $V_{TIMER}$, and the state of a reset switch, $S_{RESET}$, (as controlled by the SR latch output, Q') that corresponds to the on-time controllers of FIGS. 3A and 3B.

FIG. 4 depicts waveforms of the ramp voltage, $V_{TIMER}$, and the state of the reset switch, $S_{RESET}$, (as controlled by the SR latch output, Q') where Q'=HIGH corresponds to a closed reset switch and Q'=LOW corresponds to an open reset switch. As illustrated in FIG. 4, when the ramp voltage, $V_{TIMER}$, reaches the threshold voltage, $V_{TH}$, the comparator 250 does not respond instantaneously. From the moment the ramp voltage, $V_{TIMER}$, reaches the threshold voltage, $V_{TH}$, to the time the comparator 250 responds and the logic gates of the SR latch 218 send the reset signal, Q', a delay time, ΔT, is added to the target on-time, $T_{ON}$. Therefore, the generated on-time, $T_{ON}$, is longer than the target on-time, $T_{ON\_TARGET}$.

This delay causes the switching period, $T_S$, to get longer than the expected switching period, $T_S$, thereby lowering the switching frequency. In the case of a boost converter, the added delay time, $\Delta T$, is more pronounced when the input voltage, $V_{IN}$, is closer to the output voltage, $V_{OUT}$, or when the circuit delays are larger due to process, voltage, and temperature (PVT) variations. In the case of a buck converter, the added delay time, $\Delta T$, is more pronounced when the input voltage, $V_{IN}$, is farther from the output voltage, $V_{OUT}$, or when the circuit delays are larger due to process, voltage, and temperature (PVT) variations.

In an embodiment in accordance with the invention and in order to reduce frequency variations, the rate of increase of the ramp voltage is increased in order to reduce the time it takes for the ramp voltage to exceed the threshold voltage. In an embodiment, the rate of increase of the ramp voltage is set to correspond to the delay time, $\Delta T$, of the system. For example, the rate of increase of the ramp voltage is set to reduce the time it takes for the ramp voltage to exceed the threshold voltage by the delay time, $\Delta T$, thereby compensating for the delay time, $\Delta T$. In one embodiment, a feedback loop is added inside the on-time controller to increase the current that charges the capacitor, $C_{TIMER}$, thus increasing the rate of increase of the ramp voltage. By increasing the current that charges the capacitor, $C_{TIMER}$, the ramp voltage, $V_{TIMER}$, charges at a faster rate (e.g., has a greater slope), so that the ramp voltage, $V_{TIMER}$, reaches the threshold voltage, $V_{TH}$, earlier than would be the case without the increased charging current.

Figure 5A:
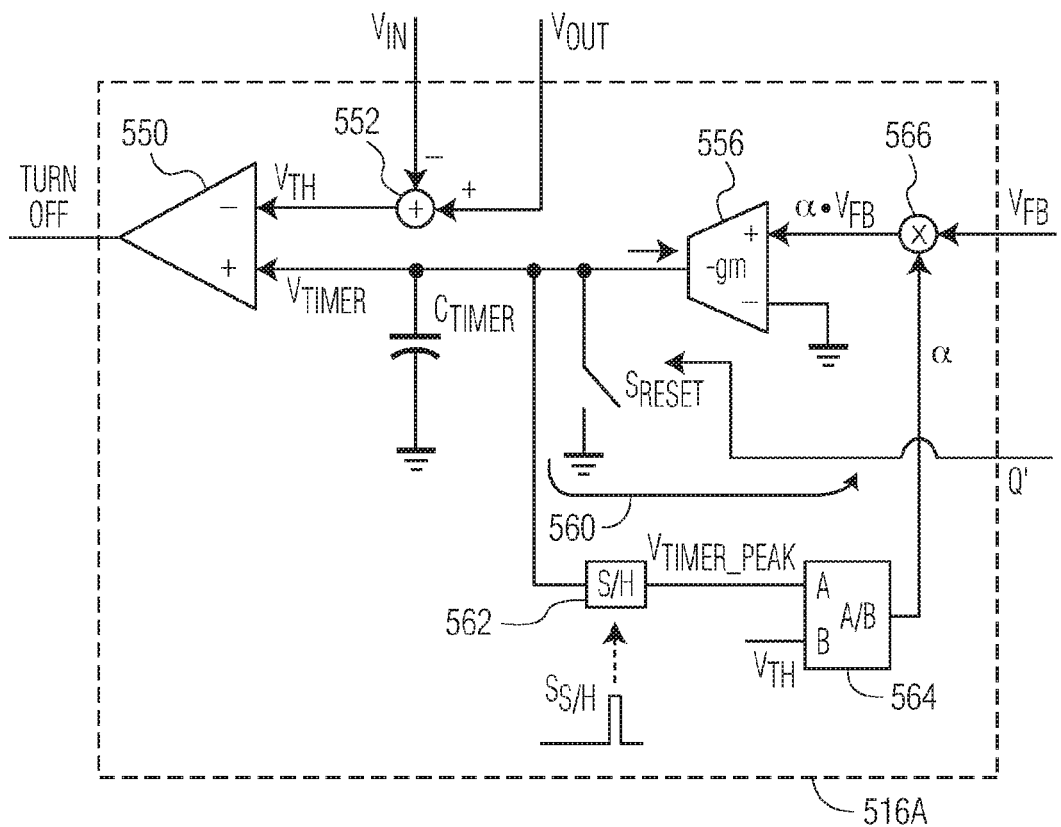
FIG. 5A depicts an embodiment of an on-time and frequency variation controller for a boost converter in accordance with an embodiment of the invention.

FIG. 5A is a block diagram of an embodiment of an on-time and frequency variation controller 516A for the boost converter 200 of FIG. 2A that is configured to increase the slope of the ramp voltage in accordance with an embodiment of the invention. The on-time and frequency variation controller includes a comparator 550, a subtractor 552, a capacitor, $C_{TIMER}$, a reset switch, $S_{RESET}$, an operational transconductance amplifier (OTA) 556 (also referred to as a "GM cell"), and a feedback loop 560 that includes a sample and hold circuit 562, a divider 564, and a multiplier 566.

Figure 5B:
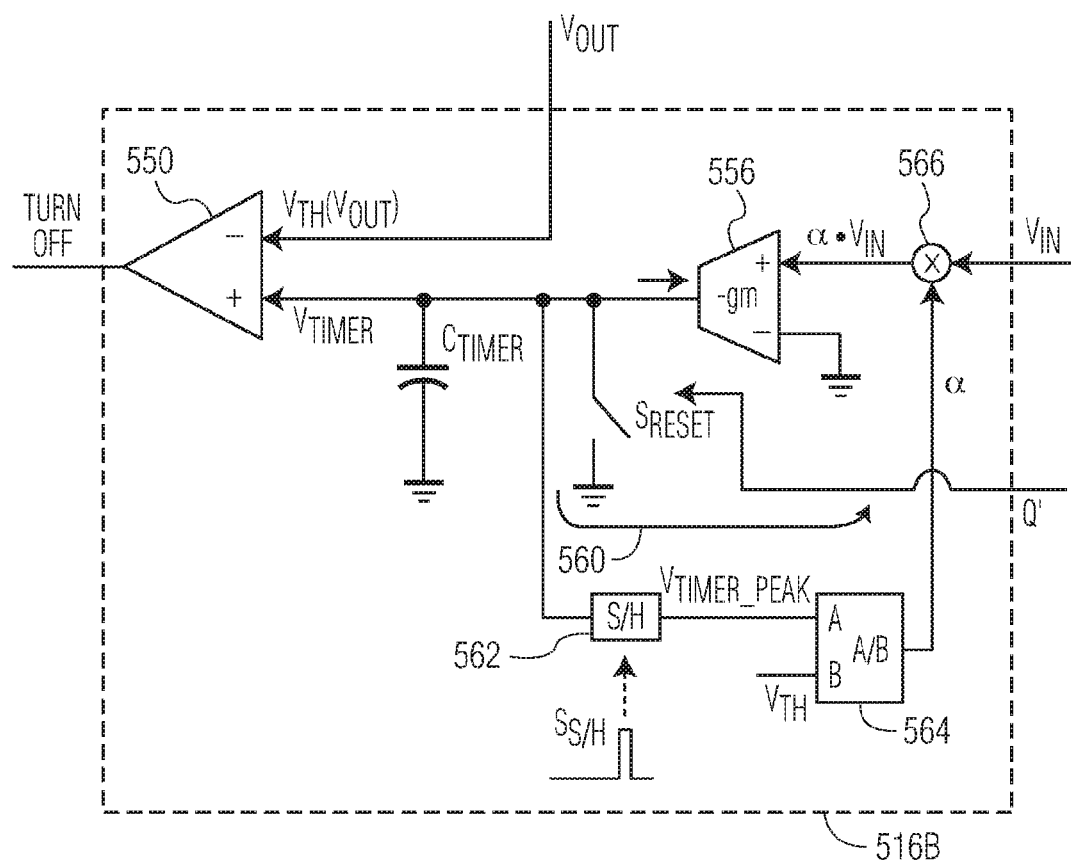
FIG. 5B depicts an embodiment of an on-time and frequency variation controller for a buck converter in accordance with an embodiment of the invention.

FIG. 5B is a block diagram of an embodiment of an on-time and frequency variation controller 516B for the buck converter 202 of FIG. 2B that is configured to increase the slope of the ramp voltage in accordance with an embodiment of the invention. The on-time controller includes a comparator 550, a capacitor, $C_{TIMER}$, a reset switch, $S_{RESET}$, an OTA 556, and a feedback loop 560 that includes a sample and hold circuit 562, a divider 564, and a multiplier 566.

Figure 6:
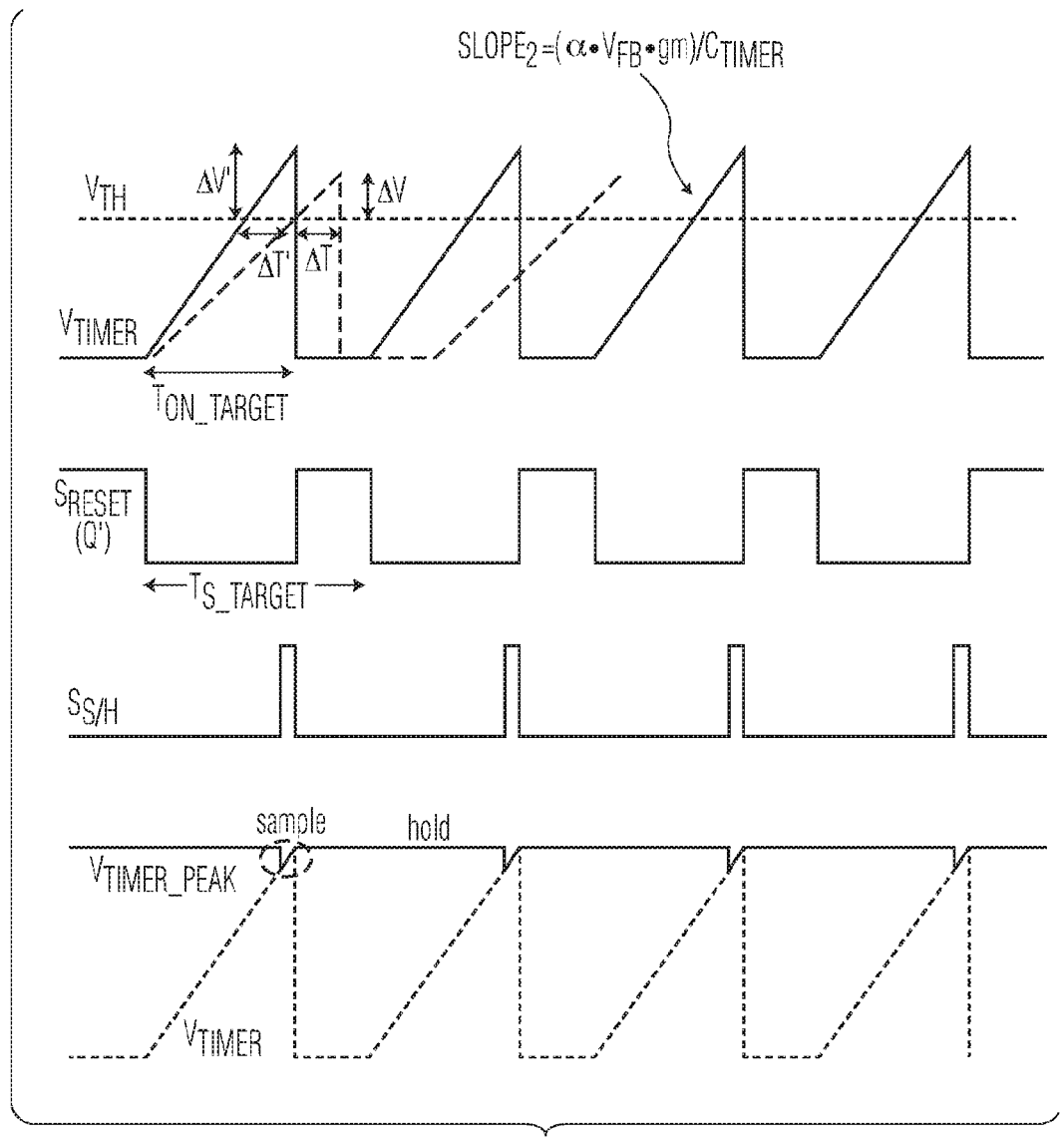
FIG. 6 depicts waveforms of the ramp voltage, $V_{TIMER}$, the state of the reset switch, $S_{RESET}$, (as controlled by the SR latch output, Q'), the sample and hold signal, $S_{S/H}$, and the peak ramp voltage, $V_{TIMER\_PEAK}$ that corresponds to the on-time and frequency variation controllers of FIGS. 5A and 5B.

FIG. 6 depicts waveforms of the ramp voltage, $V_{TIMER}$, the state of the reset switch, $S_{RESET}$, (as controlled by the SR latch output, Q'), the sample and hold signal, $S_{S/H}$, and the peak ramp voltage, $V_{TIMER\_PEAK}$, in the on-time and frequency variation controllers of FIGS. 5A and 5B. The operation of the on-time controllers 516A and 516B of FIGS. 5A and 5B is described below with reference to FIG. 6.

As stated above, in order to reduce frequency variations due to the delay time, $\Delta T$, a feedback loop 560 is added inside the on-time controller to increase the current that charges the capacitor, $C_{TIMER}$. With reference to FIG. 6, by increasing the current that charges the capacitor $C_{TIMER}$, the ramp voltage increases at a faster rate (e.g., has a greater slope), so the ramp voltage, $V_{TIMER}$, reaches the threshold voltage, $V_{TH}$, earlier. If the "saved time" is equal to the delay time, $\Delta T$, (e.g., $\Delta T'=\Delta T$ as illustrated in FIG. 6), then by the time the reset signal, Q', is ready to discharge the capacitor, $C_{TIMER}$, the resulting on-time, $T_{ON}$, will be the same as the target on-time, $T_{ON\_TARGET}$, and the resulting switching period, $T_S$ will be the same as the target switching period, $T_{S\_TARGET}$. Equation (5) demonstrates the relationship between the threshold voltage, $V_{TH}$, the target on-time, $T_{ON\_TARGET}$, the ramp voltage, $V_{TIMER}$, Slope$_1$ (FIG. 4), Slope$_2$ (FIG. 6), the threshold voltage, $V_{TH}$, and the delay time, $\Delta T$.

$$V_{TH}=\text{Slope}_1 \cdot T_{ON\_TARGET}=\text{Slope}_2 \cdot (T_{ON\_TARGET}-\Delta T) \quad (5)$$

$$\alpha=\text{Slope}_2/\text{Slope}_1=T_{ON\_TARGET}/(T_{ON\_TARGET}\times \Delta T)=(V_{TH}+\Delta V)/V_{TH} \quad (6)$$

From Equation (5), a new parameter, $\alpha$, (slope gain) is introduced. Equation (6) indicates that slope$_1$ needs to be increased $\alpha$ times, to be equal to the desired slope$_2$, which leads to increasing the current that charges the capacitor $C_{TIMER}$. The peak value of the ramp voltage, $V_{TIMER}$, is sampled with the sample and hold circuit 562 at proper moments and held for the remainder of the switching period, $T_S$. The divider 564 is utilized to divide the peak ramp voltage, $V_{TIMER\_PEAK}$, by the threshold voltage, $V_{TH}$, to generate the slope gain, $\alpha$. The feedback voltage, $V_{FB}$, is multiplied by the slope gain, $\alpha$, at multiplier 566 to control the current source that charges the capacitor, $C_{TIMER}$. Using the feedback loops 560 described with reference to FIGS. 5A, 5B, and 6, the slope of the ramp voltage, $V_{TIMER}$, is automatically adjusted to force the on-time, $T_{ON}$, to be equal to the targeted on-time, $T_{ON\_TARGET}$, therefore the resulting switching period, $T_S$, (in CCM mode) equals the targeted switching period, $T_S$. By increasing the rate of increase of the ramp voltage, $V_{TIMER}$, the switching frequency variations due to delays from the comparator and the logic gates are substantially eliminated. For example, the frequency variations are substantially eliminated when the frequency varies ±2% from the desired frequency.

The condition shown below in Equation (7A) should be held in order to make the added feedback loop (shown in FIG. 5A) remain functional.

$$T_{ON}=((V_{OUT}-V_{IN})/V_{OUT})\cdot T_S > \Delta T \quad (7A)$$

The condition shown below in Equation (7B) should be held in order to make the added feedback loop (shown in FIG. 5B) remain functional.

$$T_{ON}=(V_{OUT}/V_{IN})\cdot T_S > \Delta T \quad (7B)$$

Low speed switching converters naturally have a longer on-time, $T_{ON}$, (and switching period, $T_S$), and therefore the circuit delays are much less significant and Equations (7A and 7B) hold. On the other hand, for higher switching frequencies, the comparator and logic gates should be designed in such a way that their total/combined delay is less than the targeted on-time, $T_{ON}$.

Figure 7A:
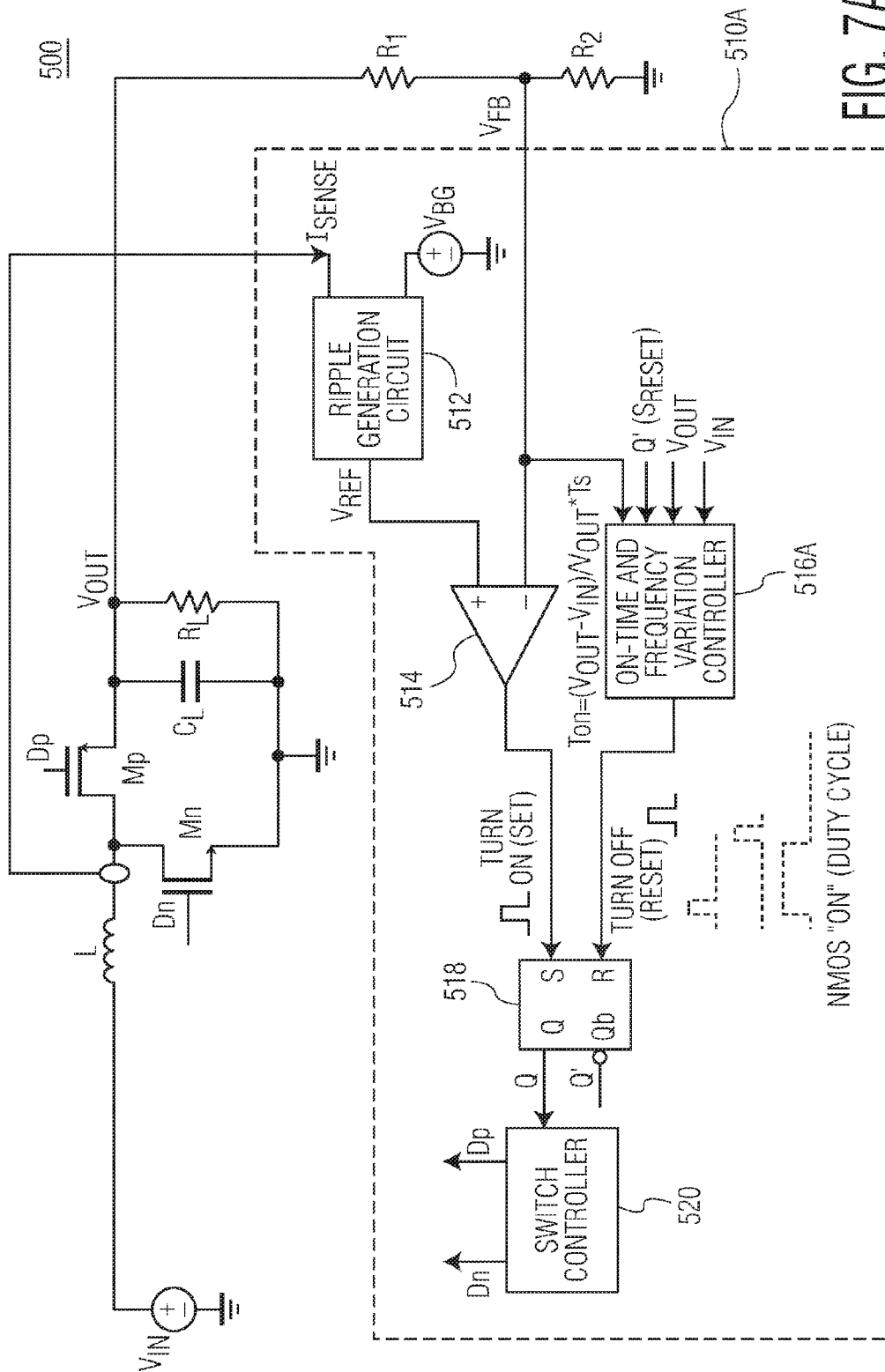
FIG. 7A depicts an embodiment of a DC-DC boost converter with an inductor current ripple based controller that is similar to the DC-DC boost converter depicted in FIG. 2A except that the DC-DC boost converter depicted in FIG. 7A includes an on-time and frequency variation controller as described above with reference to FIGS. 5A and 6.

FIG. 7A depicts an embodiment of a DC-DC boost converter 500 with an inductor current ripple based controller 510A that is similar to the DC-DC boost converter 200 depicted in FIG. 2A except that the DC-DC boost converter depicted in FIG. 7A includes an on-time and frequency variation controller 516A as described above with reference to FIGS. 5A and 6. The DC-DC boost converter depicted in FIG. 7A demonstrates fast response to line and load disturbances while keeping the frequency close to the targeted value over process, voltage, and temperature (PVT) variations.

Figure 7B:
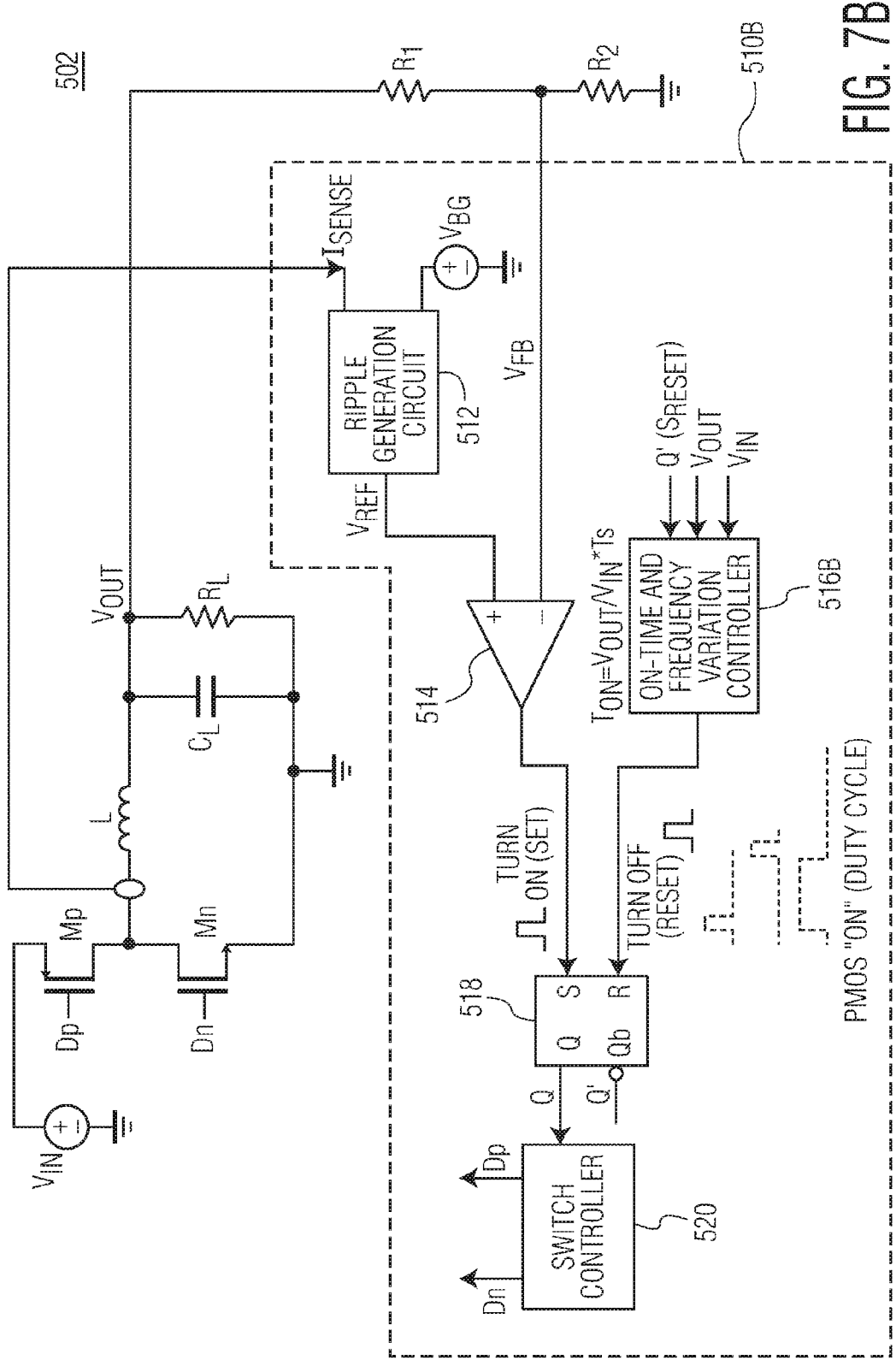
FIG. 7B depicts an embodiment of a DC-DC buck converter with an inductor current ripple based controller that is similar to the DC-DC buck converter depicted in FIG. 2B except that the DC-DC buck converter depicted in FIG. 7B includes an on-time and frequency variation controller as described above with reference to FIGS. 5B and 6.

FIG. 7B depicts an embodiment of a DC-DC buck converter 502 with an inductor current ripple based controller 510B that is similar to the DC-DC buck converter 202 depicted in FIG. 2B except that the DC-DC buck converter depicted in FIG. 7B includes an on-time and frequency variation controller 516B as described above with reference to FIGS. 5B and 6. The DC-DC buck converter depicted in FIG. 7B demonstrates fast response to line and load disturbances while keeping the frequency close to the targeted value over PVT variations.

Figure 7C:
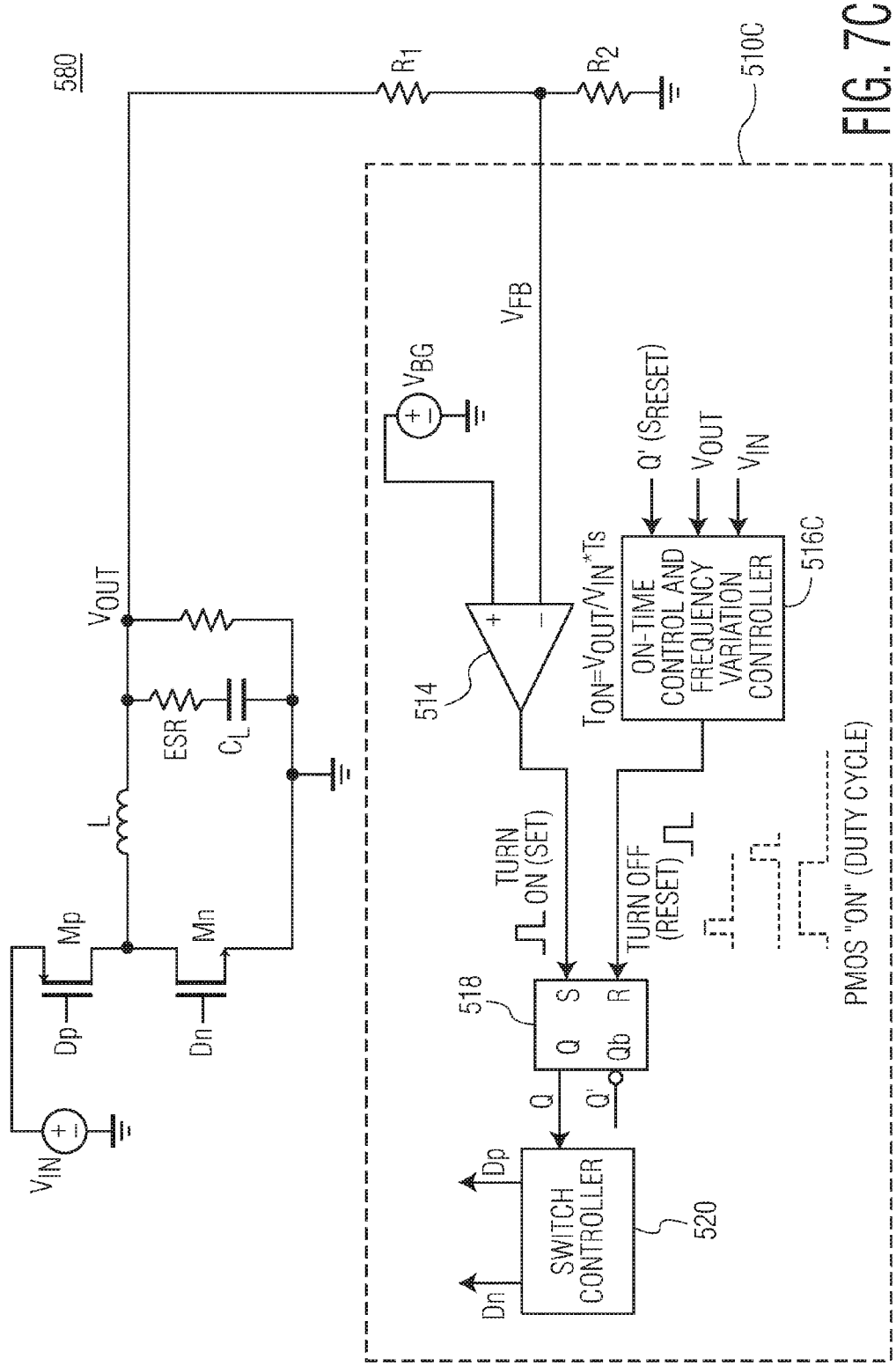
FIG. 7C depicts an embodiment of a DC-DC buck converter with an output ripple based controller and an on-time and frequency variation controller as described above with reference to FIGS. 5B and 6.

The problem of frequency variation is not limited to inductor current ripple based controllers. Output voltage ripple based controllers have the same behavior and issue. The above-described techniques for controlling frequency variation are also applicable to output voltage ripple based controllers. FIG. 7C depicts an embodiment of a DC-DC buck converter 580 with an output voltage ripple based controller 510C that is similar to the controller 510B of FIG. 7B without the ripple generation circuit 512. The controller of FIG. 7C includes an on-time and frequency variation controller 516C as described above with reference to FIGS. 5B and 6. As is known in the field, the capacitor, $C_L$, of the DC-DC converter may include an Equivalent Series Resistance (ESR) as indicated in FIG. 7C. The DC-DC buck converter depicted in FIG. 7C demonstrates fast response to line and load disturbances while keeping the frequency close to the targeted value over PVT variations.

Figure 8:
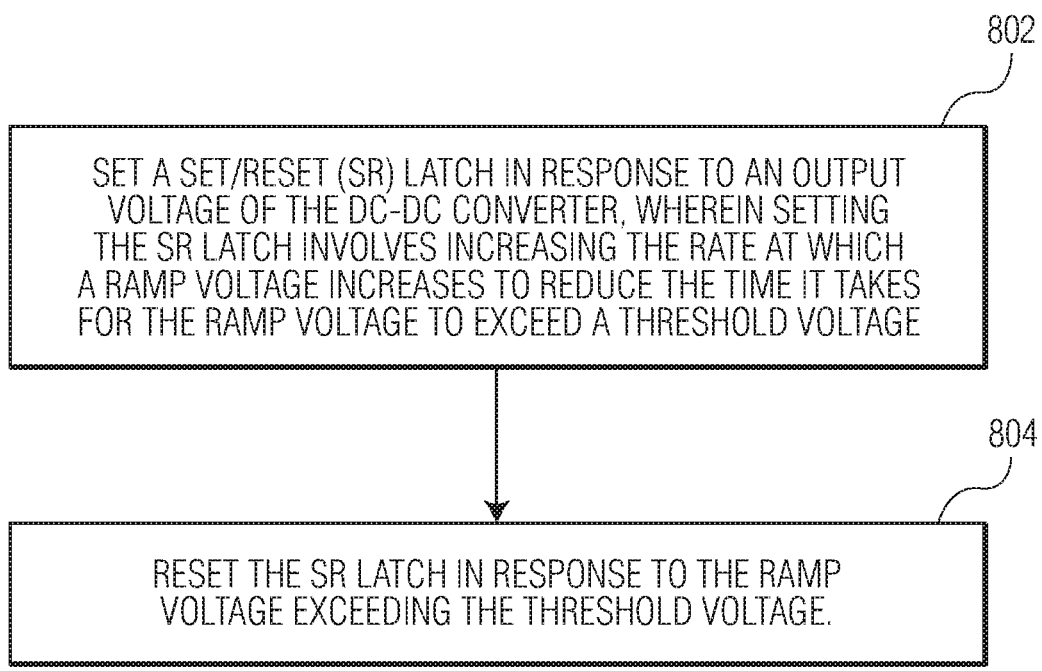
FIG. 8 is a flow diagram of a method for controlling frequency variation for a ripple based, constant-on time DC-DC converter, such as the boost and buck converters described above with reference to FIGS. 5A, 5B, 6, 7A-7C.

FIG. 8 is a flow diagram of a method for controlling frequency variation for a ripple based, constant-on time DC-DC converter. At block 802, a set/reset (SR) latch is set in response to an output voltage of the DC-DC converter, wherein setting the SR latch involves increasing the rate at which a ramp voltage increases to reduce the time it takes for the ramp voltage to exceed a threshold voltage. At block 804, the SR latch is reset in response to the ramp voltage exceeding the threshold voltage.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A circuit for controlling frequency variation for a ripple based, constant on-time DC-DC converter, the circuit comprising:
   a set/reset (SR) latch;
   a comparator configured to set the SR latch; and
   an on-time and frequency variation controller configured to reset the SR latch, wherein the on-time and frequency variation controller includes:
   a feedback loop configured to increase the rate at which a ramp voltage increases to reduce the time it takes for the ramp voltage to exceed a threshold voltage.

2. The circuit of claim 1, wherein the feedback loop comprises a circuit configured to generate a slope gain value and to increase the rate at which the ramp voltage increases as a function of the slope gain value.

3. The circuit of claim 2, wherein the feedback loop comprises a sample and hold circuit, a divider, and a multiplier.

4. The circuit of claim 3, wherein the sample and hold circuit is configured to output a sampled and held value to the divider, the divider is configured to divide the sampled and held value by the threshold voltage to produce the slope gain value, and the multiplier is configured to multiply by the slope gain value.

5. An inductor current ripple based, constant on-time DC-DC boost converter comprising the circuit of claim 1.

6. An inductor current ripple based, constant on-time DC-DC buck converter comprising the circuit of claim 1.

7. An output voltage ripple based, constant on-time DC-DC buck converter comprising the circuit of claim 1.

8. A method for controlling frequency variation for a ripple based, constant on-time DC-DC converter, the method comprising:
   setting a set/reset (SR) latch in response to an output voltage of the DC-DC converter, wherein setting the SR latch involves increasing the rate at which a ramp voltage increases to reduce the time it takes for the ramp voltage to exceed a threshold voltage; and
   resetting the SR latch in response to the ramp voltage exceeding the threshold voltage.

9. The method of claim 8 wherein increasing the rate at which the ramp voltage increases involves sampling and holding the ramp voltage to capture a peak ramp voltage.

10. The method of claim 9 wherein increasing the rate at which the ramp voltage increases involves dividing the peak ramp voltage by the threshold voltage to generate a slope gain value.

11. The method of claim 10 wherein increasing the rate at which the ramp voltage increases involves multiplying a voltage by the slope gain value.

12. An inductor current ripple based, constant on-time DC-DC boost converter configured to implement the method of claim 8.

13. An inductor current ripple based, constant on-time DC-DC buck converter configured to implement the method of claim 8.

14. An output voltage ripple based, constant on-time DC-DC buck converter configured to implement the method of claim 8.

15. A circuit for controlling frequency variation for an inductor current ripple based, constant on-time DC-DC converter, the circuit comprising:
   a set/reset (SR) latch;
   a comparator configured to set the SR latch; and
   an on-time and frequency variation controller configured to reset the SR latch, wherein the on-time and frequency variation controller includes:
   a comparator having a first input and a second input;
   a capacitor connected to the second input of the comparator and configured to provide a ramp voltage to the comparator;
   a reset switch connected to the second input of the comparator;
   an operational transconductance amplifier (OTA) connected to the second input of the comparator and having a first input and a second input; and
   a feedback loop connected between the second input of the comparator and the first input of the OTA and configured to increase the rate at which the ramp voltage increases.

16. The circuit of claim 15, wherein the feedback loop comprises a circuit configured to generate a slope gain value and to increase the rate at which the ramp voltage increases as a function of the slope gain value.

17. The circuit of claim 16, wherein the feedback loop comprises a sample and hold circuit, a divider, and a multiplier.

18. The circuit of claim 17, wherein the sample and hold circuit is configured to output a sampled value to the divider, the divider is configured to divide the sampled value by the threshold voltage to produce the slope gain value, and the multiplier is configured to multiply by the slope gain value.

19. An inductor current ripple based, constant on-time DC-DC boost converter comprising the circuit of claim 15.

20. An inductor current ripple based, constant on-time DC-DC buck converter comprising the circuit of claim 15.

* * * * *